US007193996B2

(12) United States Patent
Dobbins et al.

(10) Patent No.: US 7,193,996 B2
(45) Date of Patent: Mar. 20, 2007

(54) SYSTEM AND METHOD FOR DETERMINING A SOURCE OF AN INTERNET PROTOCOL PACKET

(75) Inventors: Ephraim Webster Dobbins, Windham, NH (US); Robert Flagg Penfield, Concord, MA (US); Ajay Manju, Cambridge, MA (US); Ping Zhou, Burlington, MA (US)

(73) Assignee: Acme Packet, Inc., Burlington, MA (US)

( * ) Notice: Subject to any disclaimer, the term of this patent is extended or adjusted under 35 U.S.C. 154(b) by 1163 days.

(21) Appl. No.: 10/085,324

(22) Filed: Feb. 28, 2002

(65) Prior Publication Data

US 2003/0161310 A1    Aug. 28, 2003

(51) Int. Cl.
*H04L 12/56* (2006.01)
(52) U.S. Cl. ........................................ 370/392; 370/401
(58) Field of Classification Search ..................... None
See application file for complete search history.

(56) References Cited

U.S. PATENT DOCUMENTS

| 7,013,333 | B1 * | 3/2006 | Skells ........................ 709/223 |
| 7,031,314 | B2 * | 4/2006 | Craig et al. .................. 370/392 |
| 2003/0123421 | A1 * | 7/2003 | Feige et al. ................. 370/338 |

FOREIGN PATENT DOCUMENTS

| WO | WO 00/33536 | 6/2000 |
| WO | WO 01/37510 A2 | 5/2001 |

OTHER PUBLICATIONS

U.S. Appl. No. 60/309,213.*

(Continued)

*Primary Examiner*—Chau Nguyen
*Assistant Examiner*—Rhonda Murphy
(74) *Attorney, Agent, or Firm*—Thomas, Kayden, Horstemeyer & Risley, LLP

(57) ABSTRACT

A system and method for determining a source of an Internet protocol packet (IP). Generally, the system comprises a memory and a processor. The processor compares a destination address of the IP packet to a first destination address stored within a first destination address cell of the memory, and compares a destination port of the IP packet to a first destination port stored within a first destination port cell of the memory. The network processor also compares a source address of the IP packet to a first source address stored within a first source address cell of the memory, and compares a source port of the IP packet to a first source port stored within a first source port cell of the memory, wherein the stored first source address and the stored first source port are associated with the stored first destination address and the stored first destination port. The network processor also stores the source address and source port of the IP packet within the memory to determine the source of the IP packet if: the destination address and destination port of the IP packet match the stored first destination address and stored first destination port; the source address and source port of the IP packet do not match the stored first source address and stored first source port; and the stored first source address and stored first source port are universally accepted bits.

21 Claims, 7 Drawing Sheets

| | SOURCE IP ADDRESS | DESTINATION IP ADDRESS | SOURCE PORT | DESTINATION PORT | WEIGHT | FLAG | TRANSLATION ADDRESSES |
|---|---|---|---|---|---|---|---|
| 332 | 1.1.1.1 | 2.2.2.2 | 1001 | 2001 | 127 | | 10.1.1.1/ 20.2.2.2 |
| 334 | X | 2.2.2.2 | X | 2001 | 64 | L | X/20.2.2.2 |
| 336 | 2.2.2.1 | 2.2.2.2 | 3000 | 2001 | 127 | | 20.2.2.1/ 20.2.2.2 |
| 338 | 3.3.3.3 | 2.2.2.2 | 5000 | 2001 | 127 | | 30.3.3.3/ 20.2.2.2 |

OTHER PUBLICATIONS

U.S. Appl. No. 60/291,918.*
European Examination Report.
Schulzrinne et al., "RTP: A Transport Protocol for Real-Time Applications," Network Working Group, Jan. 1996, pp. 1-66.
Swale et al., "Requirements for the MIDCOM Architecture and Control Language," MIDCOM Working Group, Internet Draft, Feb. 2001, pp. 1-24.
Srisuresh et al., "Middlebox Communication Architecture and Framework," Network Working Group, Internet Draft, Feb. 2001, pp. 1-37.
Martin et al., "SIP Through NAT Enabled Firewall Call Flows," Midcom Working Group, Internet Draft, Feb. 2001, pp. 1-63.
Rosenberg et al., "Getting SIP through Firewalls and NATs," Internet Engineering Task Force, Internet Draft, Feb. 22, 2000, pp. 1-57.
Eliot Lear, "A Middle Box Architectural Framework," Network Working Group, Internet Draft, Jan. 31, 2001, pp. 1-12.
Rosenberg et al., "SIP Traversal through Residential and Enterprise NATs and Firewalls," Internet Engineering Task Force, Internet Draft, Mar. 2, 2001, pp. 1-41.
Carpenter et al., "Middleboxes: Taxonomy and Issues," The Internet Society, Internet Engineering Task Force, Internet Draft, Apr. 2001, pp. 1-24.
B. Biggs, "A SIP Application Level Gateway for Network Address Translation," Internet Draft, Mar. 2000, pp. 1-16.
Kuthan et al., "Middlebox Communication: Framework and Requirements," Internet Engineering Task Force, Internet Draft, Nov. 2000, pp. 1-23.
P. Srisuresh, "Framework for Interfacing with Network Address Translator," NAT Working Group, Internet Draft, Apr. 2000, pp. 1-58.
Mart et al., "Firewall Control Requirements," MidCom Bof, Internet Draft, Nov. 2000, pp. 1-16.
Melinda Shore, "H.323 and Firewalls: Problem Statement and Solution Framework," Internet Draft, Feb. 3, 2000, pp. 1-19.
Thernelius et al., "SIP Firewall Solution," SIP Working Group, Internet Draft, Jul. 2000, pp. 1-32.
N. Freed, "Behavior of and Requirements for Internet Firewalls," Network Working Group, Internet Draft, Oct. 2000, pp. 1-14.
D. Newman, "Benchmarking Terminology for Firewall Performance," Network Working Group, The Internet Society, Aug. 1999, pp. 1-51.
F. Finlayson, "IP Multicast and Firewalls," Network Working Group, The Internet Society, May 1999, pp. 1-23.
S. Bellovin, "Firewall-Friendly FTP," Network Working Group, Feb. 1994, pp. 1-7.
Montenegro et al., "Sun's SKIP Firewall Traversal for Mobile IP," Network Working Group, The Internet Society, Jun. 1998, pp. 1-45.
Gaynor et al., "Firewall Enhancement Protocol (FEP)," Network Working Group, The Internet Society, Apr. 1, 2001, pp. 1-22.
Dr. Andrew Molitor, "A Firewall Solution for Voice Over IP," Aravox Report, Aravox Technologies, pp. 1-2.
"Aravox Firewall Benefits," Aravox Technologies, pp. 1-9.
Dr. Andrew Molitor, "Can Voice Over IP Work Without Dynamic NAT?," Aravox Report, Aravox Technologies, pp. 1-2.
Dr. Andrew Molitor, "Deploying a Dynamic Voice over IP Firewall with IP Telephony Applications," Aravox Report, Aravox Technologies, pp. 1-5.
Dr. Andrew Molitor, "Firewall Control for IP Telephony," Aravox Report, Aravox Technologies, pp. 1-6.
Molitor et al., "High Performance H.323 Firewalling for VoIP Solutions," Aravox Report, Aravox Technologies, pp. 1-2.
"What is Unique about IP Telephony?," Aravox Technologies, Spring 2001 IT Expo, pp. 1-16.
Dr. Andrew Molitor, "Securing VoIP Networks with Specific Techniques, Comprehensive Policies and VoIP-Capable Firewalls," Aravox Report, Aravox Technologies, pp. 1-3.
Utz Roedig, "Security Analysis of IP-Telephony Scenarios," Presentation by Darmstadt University of Technology, pp. 1-28.
Fredrik Thernelius, "SIP, NAT, and Firewalls," Master Thesis, Ericsson, May 2000, pp. 1-69.
Steven M. Bellovin, "Distributed Firewalls"; login: Magazine, Nov. 1999, pp. 37-39 (1-10).
"Firewall ActiveX Control for Microsoft Windows," Distinct Corporation, 1998, pp. 1-45.

Jiri Kuthan, "Firewall Control," Flow Processing Control Protocol, pp. 1-3.
Alan Crosswell, "Advanced Networking Information," Columbia University Academic Information Systems, Mar. 21, 2000, pp. 1-22.
"Cisco Secure PIX Firewall Software v5.2," Cisco Data Sheet, pp. 1-7.
"Cisco Secure PIX 500 Firewalls," Cisco Products & Technologies, 2000, pp. 1-3.
"Cisco Secure PIX Firewall," Internet Product Watch, Apr. 12, 2001, pp. 1-2.
"Media Firewall," www.marconi.com, 2000, pp. 1-4.
"Media Firewall," www.marconi.com, 2001, pp. 1-3.
"ATM Switch Network Modules: LAN, WAN, and Service Interfaces for TNX-210, TNX-1100, ASX-200BX, ASX-1000 and ASX-1200 ATM Switches," www.marconi.com, 2000, pp. 1-12.
"Marconi's Next Generation IP and Multi-Service Switch Router Enables End-to-End Differentiated Services," www.marconi.com, Nov. 6, 2000, pp. 1-3.
"Transforming Communications and Information with Enterprise-Focused Ethernet Solutions," www.marconi.com., pp. 1-6.
"Marconi Expands Networking Product Portfolio with Solutions for Emerging Enterprise Needs," www.marconi.com, Jul. 24, 2000, pp. 1-2.
"Marconi to Showcase 'Smart and Fast' Switch/Router at CeBIT," www.marconi.com, Jan. 22, 2001, pp. 1-2.
"Marconi Demonstrates Converged Distance-Learning Solutions at Educause 2000," www.marconi.com, Oct. 10, 2000, pp. 1-2.
"Firewall Security," www.marconi.com, Oct. 30, 2000, pp. 1-2.
"SA-400, IP/ATM Firewalling for ATM Networks," www.marconi.com, 2000, pp. 1-4.
"NSX-9500, Routing, LANE, and Firewalling Services for ATM Backbone Networks," www.marconi.com, 2000, pp. 1-4.
"The New Public Network: Scalable, Flexible, PSTN Features, IN Features, Signalling Gateway," www.marconi.com, 1999, pp. 1-4.
"Sphericall Voice Internetworking Multiplexer (VIM) Product Overview," www.marconi.com, 2001, p. 1.
"ServiceOn Accountant 2.0: Per-call Usage Based Billing for Differentiated Services," www.marconi.com, Dec. 12, 2000, pp. 1-2.
"Marconi Extends Optical Networking; Introduces Advanced Multiservice Platform," www. marconi.com, Jun. 6, 2000, pp. 1-2.
"ATM Switched Network Modules Product Overview," www.marconi.com, 2001, pp. 1-4.
"Security is the Key," Marconi Interface, May 2000, p. 30.
"Firewall Switching Agent," www.marconi.com, 2001, pp. 1-4.
"ESX-2400 and ESX-4800 Firewall Accelaration Switches," www.marconi.com, 2001, pp. 1-8.
"ESX-2400 and ESX-4800 Product Overview," www.marconi.com, 2001, pp. 1-3.
"FSA Product Overview," www.marconi.com, 2001, pp. 1-2.
Parthenios, "Hackers Beware," Telephony, Jun. 18, 2001, pp. 1-2.
"Aravox Expands IP Platform to Include VoIP," CommWeb.com, May 30, 2001, p. 1.
"Aravox Expands IP Network Services Platform to Carriers and xSP's Deploying VoIP," biz.yahoo.com., May 29, pp. 1-2.
"Aravox Expands IP Network Services Platform to Carriers and Service Providers Deploying VoIP,". TMCnet.com, May 29, 2001, pp. 1-2.
"Solutions,": www.aravox.com/solutions, 2001, p. 1.
"The Aravox Network Services Platform Solution for Backbone Carriers," www.aravox.com/backbone, 2001, p. 1.
"The Aravox Network Services Platform Solution for Access Providers," www.aravox.com/access, 2001, p. 1.
"The Aravox Network Services Platform Solution for Enterprises," www.aravox.com/enterprise, 2001, p. 1.
"SIP ALG for Firewall Traversal (Application Level Gateway)," www.microappliances.com, 2000, p. 1.
"SIP Firewall/Outbound Proxy Server (ALG)," www.microappliances.com, 2000, p. 1.
"Microappliances SIP Phone (ActiveX)," www.microappliances, 2000, p. 1.
"Convergence Data and Telephony Platform," www.microappliances.com, 2000, p. 1.

* cited by examiner

| SOURCE IP ADDRESS | DESTINATION IP ADDRESS | SOURCE PORT | DESTINATION PORT | WEIGHT | FLAG | TRANSLATION ADDRESSES |
|---|---|---|---|---|---|---|
| | | | | | | |
| | | | | | | |
| | | | | | | |
| | | | | | | |

FIG. 4

| | SOURCE IP ADDRESS | DESTINATION IP ADDRESS | SOURCE PORT | DESTINATION PORT | WEIGHT | FLAG | TRANSLATION ADDRESSES |
|---|---|---|---|---|---|---|---|
| 332 | 1.1.1.1 | 2.2.2.2 | 1001 | 2001 | 127 | | 10.1.1.1/ 20.2.2.2 |
| 334 | X | 2.2.2.2 | X | 2001 | 64 | L | X/20.2.2.2 |
| 336 | 2.2.2.1 | 2.2.2.2 | 3000 | 2001 | 127 | | 20.2.2.1/ 20.2.2.2 |
| 338 | 3.3.3.3 | 2.2.2.2 | 5000 | 2001 | 127 | | 30.3.3.3/ 20.2.2.2 |

FIG. 5A

| SOURCE IP ADDRESS | DESTINATION IP ADDRESS | SOURCE PORT | DESTINATION PORT | WEIGHT | FLAG | TRANSLATION ADDRESSES |
|---|---|---|---|---|---|---|
| 1.1.1.1 | 2.2.2.2 | 1001 | 2001 | 127 | | 10.1.1.1/20.2.2.2 |
| X | 2.2.2.2 | X | 2001 | 64 | L | X/20.2.2.2 |
| 2.2.2.1 | 2.2.2.2 | 3000 | 2001 | 127 | | 20.2.2.1/20.2.2.2 |
| 3.3.3.3 | 2.2.2.2 | 5000 | 2001 | 127 | | 30.3.3.3/20.2.2.2 |
| 4.4.4.4 | 2.2.2.2 | 2000 | 2001 | 127 | | 4.4.4.4/20.2.2.2 |

FIG. 5B

| | SOURCE IP ADDRESS | DESTINATION IP ADDRESS | SOURCE PORT | DESTINATION PORT | WEIGHT | FLAG | TRANSLATION ADDRESSES |
|---|---|---|---|---|---|---|---|
| 332 | 1.1.1.1 | 2.2.2.2 | 1001 | 2001 | 127 | | 10.1.1.1/20.2.2.2 |
| 334 | | | | | | | |
| 336 | 2.2.2.1 | 2.2.2.2 | 3000 | 2001 | 127 | | 20.2.2.1/20.2.2.2 |
| 338 | 3.3.3.3 | 2.2.2.2 | 5000 | 2001 | 127 | | 30.3.3.3/20.2.2.2 |
| 342 | 4.4.4.4 | 2.2.2.2 | 2000 | 2001 | 127 | | 4.4.4.4/20.2.2.2 |

FIG. 5C

SYSTEM AND METHOD FOR DETERMINING A SOURCE OF AN INTERNET PROTOCOL PACKET

CROSS-REFERENCE TO RELATED APPLICATIONS

This application incorporates by reference U.S. patent application entitled, "System and Method for Determining Flow Quality Statistics for Real-Time Transport Protocol Data Flows," filed on Jul. 23, 2001, and having Ser. No. 09/911,256; U.S. patent application entitled, "System and Method for Providing Rapid Rerouting of Real-Time Multimedia Flows," filed on Jul. 23, 2001, and having Ser. No. 09/911,304; U.S. patent application entitled, "System and Method for Providing Encryption for Rerouting of Real-Time Multimedia Flows," filed on Aug. 28, 2001, and having Ser. No. 09/941,229; and U.S. patent application entitled, "System and Method for Improving Communication Between a Switched Network and a Packet Network," filed on Nov. 2, 2001, having Ser. No. 10/000409, all of the foregoing disclosures of which are incorporated by reference herein in their entirety.

FIELD OF THE INVENTION

The present invention generally relates to telecommunications and, more particularly, is related to a system and method for determining a source of a received Internet protocol packet.

BACKGROUND OF THE INVENTION

The public switched telephone network (PSTN) has evolved into an efficient real-time, multimedia communication session tool, wherein users can pick up any one of nearly one billion telephones and dial any one of nearly one billion endpoints. Several developments have enabled this automated network, such as numbering plans, distributed electronic switching and routing, and networked signaling systems.

Similar to the manner in which the PSTN is based on a hierarchy, the Internet is based on an Internet protocol (IP). IP messages, or multimedia packets, are routed or forwarded from a source of a multimedia flow to a destination of the multimedia flow. Each multimedia packet comprises an IP address, which, in Internet protocol version 4 (IPv4), for example, has 32 bits. Each IP address also has a certain number of bits dedicated to a network portion and a certain number of bits dedicated to a host portion. It should be noted that the term "multimedia" utilized herein is intended to comprise one or more of the following: voice, data, text, graphics, animation, and/or discrete media.

More specifically, multimedia packets comprise a header portion and an IP packet data portion. The header portion of the multimedia packet, at a minimum, comprises at least a source portion and a destination portion, wherein the source portion identifies a source address from which the packet originated, and the destination portion identifies a destination address to which the packet is addressed. It should be noted that additional portions of the header portion may be provided, in addition to the source portion and the destination portion such as, but not limited to, a real-time packet header or a real-time control packet header.

The IP packet data portion of the multimedia packet comprises the remaining portion of the multimedia packet, which comprises data that is being transmitted to a destination device located at the destination address.

As the multimedia packet is received by different devices on a path taken by the multimedia packet to the destination device, it is common for the source and/or destination portions of the multimedia packet to change properties, thereby reflecting a most recent source and destination.

Therefore, it is difficult to determine the original source of a multimedia packet. Having knowledge of the original source of a multimedia packet allows the destination device to accept or decline acceptance of the multimedia packet based upon the original source of the multimedia packet.

The acceptance or denial of multimedia packets based upon the original source is a characteristic of devices such as, but not limited to, firewalls. Unfortunately, since the header portion of the multimedia packet is changed by devices within the transmission path to the destination device, the original source of the multimedia packet is not known. Since the original source is not known, the destination device is not capable of accurately declining receipt of multimedia packets from a predefined source.

SUMMARY OF THE INVENTION

In light of the foregoing, the preferred embodiment of the present invention generally relates to a system for accurately determining an original source of a received multimedia packet.

Generally, with reference to the structure of the source determination system, the system utilizes a memory and a processor. The processor compares a destination address of the IP packet to a first destination address stored within a first destination address cell of the memory, and compares a destination port of the IP packet to a first destination port stored within a first destination port cell of the memory. The processor also compares a source address of the IP packet to a first source address stored within a first source address cell of the memory, and compares a source port of the IP packet to a first source port stored within a first source port cell of the memory, wherein the stored first source address and the stored first source port are associated with the stored first destination address and the stored first destination port. The processor also stores the source address and source port of the IP packet within the memory to determine the source of the IP packet if: the destination address and destination port of the IP packet match the stored first destination address and stored first destination port; the source address and source port of the IP packet do not match the stored first source address and stored first source port; and the stored first source address and stored first source port are universally accepted bits.

It should be noted that the present invention can also be viewed as providing a method for determining a source of an IP packet.

Other systems and methods of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components of the drawings are not necessarily to scale, emphasis instead being placed upon clearly illustrating the principles of the present invention. Moreover, in the drawings, like referenced numerals designate corresponding parts throughout the several views.

FIG. 4 is a multimedia packet flow table located within a CAM of the media router of FIG. 2.

FIG. 5A is a block diagram illustrating a multimedia packet flow table utilized to provide an example of use of the present source determination system.

FIG. 5B is a block diagram illustrating the multimedia packet flow table of FIG. 5A after addition of a fifth table group.

FIG. 5C is a block diagram illustrating the multimedia packet flow table of FIG. 5B after removal of a second table group.

DETAILED DESCRIPTION OF THE PREFERRED EMBODIMENT

Figure 1:
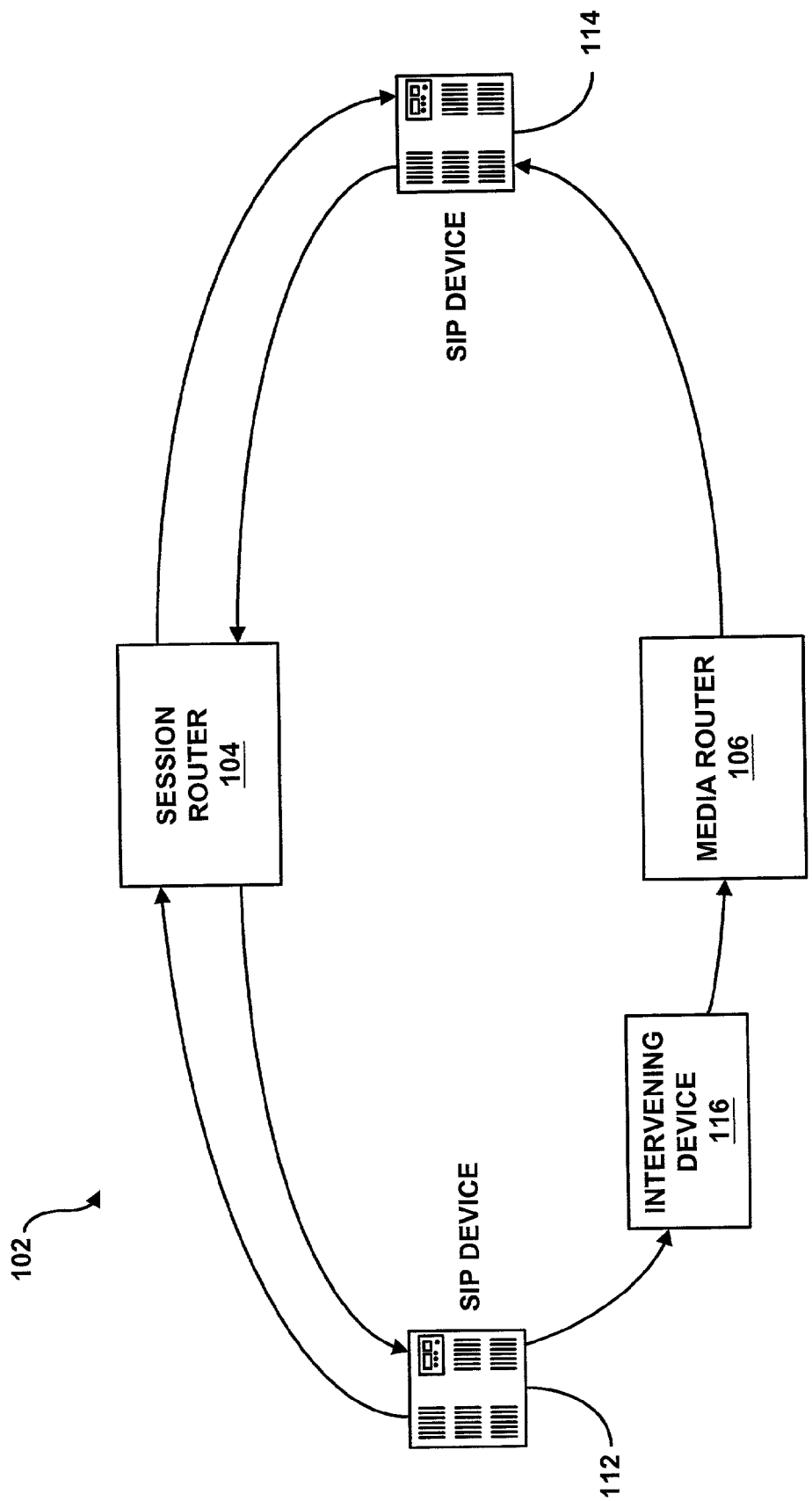
FIG. 1 is a block diagram illustrating a communication network for providing the present source determination system.

The source determination system of the present invention can be implemented in software, firmware, hardware, or a combination thereof. In the preferred embodiment of the invention, which is intended to be a non-limiting example, a portion of the system is implemented in software that is executed by a network processor.

The software based portion of the source determination system, which comprises an ordered listing of executable instructions for implementing logical functions, can be embodied in any computer-readable medium for use by, or in connection with, an instruction execution system, apparatus, or device such as a computer-based system processor containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus or device.

The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

In the transmission of multimedia data packets from a first endpoint to a second endpoint, it is desirable to process multiple transmission routes and to select a best transmission route. An example of a system that provides for route processing and selection is provided by the co-pending U.S. patent application entitled, "System and Method for Assisting in Controlling Real-time Transport Protocol Flow Through Multiple Networks via Multi-media Flow Routing," by MeLampy et. al., filed on Jul. 23, 2001, and having Ser. No. 09/911,256 (hereinafter, "the '256 patent application"), the disclosure of which is hereby incorporated by reference in its entirety.

The '256 patent application teaches use of a session router to select multiple routes and process them in order, selecting from a set of session initiation protocol (SIP) agent(s) that are otherwise equal using various distribution strategies. This process leads to managing the path of the resulting real-time transport protocol (RTP) flow. The U.S. patent application entitled "System and Method for Providing Rapid Rerouting of Real Time Multi-media Flows," by MeLampy et. al., filed on Jul. 23, 2001, having Ser. No. 09/911,304 (hereinafter "the '304 patent application"), the disclosure of which in hereby incorporated by reference in its entirety, teaches use of media routers for guiding the resulting RTP flows selected and processed by the session router through certain thresholds. Therefore, the combination of the abovementioned '256 and '304 patent applications creates a high-quality border between various IP networks. Without these mechanisms, data packets would flow whichever way networks would allow.

FIG. 1 is a block diagram illustrating a communication network 102, wherein the use of a session router 104 and media router 106 is demonstrated, for implementation of the present source determination system. As shown by FIG. 1, a first session initiation protocol (SIP) device 112, herein a SIP phone, such as those produced by and commercially available from Pingtel of Massachusetts, U.S.A., is connected to a second SIP device 114, herein a second SIP phone. Communication between the first SIP phone 112 and the second SIP phone 114 is enabled by the session router 104 and the media router 106 and may be provided via the Internet. It should be noted that communication between the first SIP phone 112 and the second SIP phone 114 may instead be provided via a wide area network (WAN) or local area network (LAN). Also, the Internet may instead be a data network domain, if the media router 106 is utilized between two domains within the Internet, with the first SIP phone 112 in a first domain and the second SIP phone 114 is a second domain.

The session router 104 provides SIP and telephony routing over IP (TRIP) protocol support as described in detail by the presently pending application entitled, "System and Method for Assisting in Controlling Real-Time Transport Protocol Flow Through Multiple Networks," by MeLampy et. al., having Ser. No. 09/844,204, and filed on Apr. 27, 2001, the disclosure of which is incorporated herein by its entirety.

It should be noted that additional session routers and media routers may be provided within the communication network 102. In fact, communication from a first media router may be to a second media router, a session router, a SIP device, and/or a non-SIP device located in a LAN, WAN, or other location.

Figure 2:
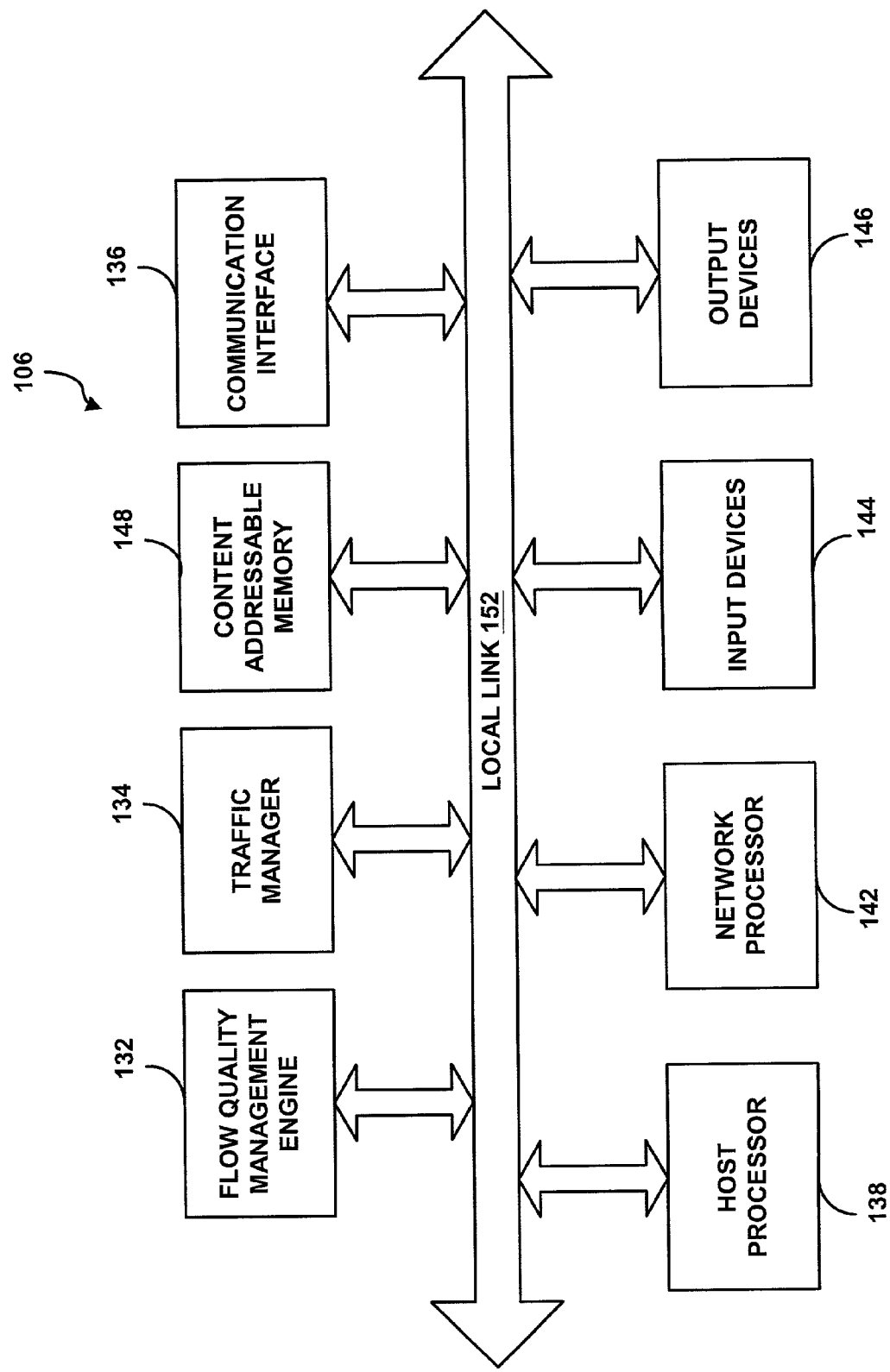
FIG. 2 is a block diagram further illustrating the media router of FIG. 1.

The introduction of media routers into the real-time multimedia flow forces multimedia packets through a known interface. FIG. 2 is a block diagram further illustrating the media router 106 of FIG. 1. As shown by FIG. 2, the media router 106 comprises a flow quality management engine 132, a traffic manager 134, a communication interface 136, a host processor 138, a network processor 142, input devices 144 and output devices 146, and a content addressable memory (CAM) 148, or a ternary database, all of which communicate within the media router 106 via a local link 152. Each of the above-mentioned are described in detail in the presently pending '304 patent application.

Specifically, the traffic manager 134 is preferably used for measuring and enforcing IP session multimedia flow rates, or traffic, for providing traffic measurement. An example of a suitable traffic manager among the many possible implementations is a commercially available NPX5700 traffic manager sold by MMC Networks located in California, USA. Essentially, the traffic manager 134 measures the number of multimedia packets that flow through the communication interface 136. The traffic manager 134 works in concert with the network processor 142 such that once a forwarding decision is made, the traffic manager 134 queues the received packet into its respective IP flow and associated priority.

As is known in the art, the traffic manager 134 comprises a memory for temporarily storing received multimedia packets. From an inbound perspective, the traffic manager 134 is able to monitor RTP multimedia flows and enforce maximum data rates by either dropping multimedia packets or marking them as eligible for discarding if they are outside a bandwidth allocated for the multimedia flow. The traffic manager 134 may also be instructed by the session router 104 to accept a specific amount of multimedia in accordance with an allocated bandwidth and bit rate. Therefore, if multimedia is received at a higher bit rate than allowed by the session router 104, the multimedia received at the higher bit rate is not transmitted. It should be noted that the characteristics specified by the session router 104 may instead be programmed directly into the media router 106 without using the session router 104.

The network processor 142 provides translation services within the media router 106. The translation services performed by the network processor 142 comprise the capability to translate a source address, destination address, source port, destination port or any combination of these fields. In addition, the network processor 142 is capable of removing and/or inserting a multi-protocol label switching (MPLS) tag in a multimedia packet. In addition, the network processor 142 is capable of inserting or modifying a diffserv codepoint located within the IP header of a multimedia packet, which is used to modify priority of the multimedia packets.

The flow quality management engine 132 provides quality measurement services on a per flow basis, wherein a multimedia flow is defined by a source IP address, a destination IP address, a source port, and/or a destination port. Quality measurement preferably comprises maintaining current statistics for the flow within the network processor 142, as well as aggregate and/or min/max statistics for the flow where applicable.

Examples of statistics that may be collected include latency, jitter and packet loss for a pre-defined window of time. It should be noted that the window can be identified via the session router 104 or the media router 106. Aggregate statistics may include transmitted packets, dropped packets and/or duplicate packets. Minimum and maximum statistics, otherwise referred to as "boundary statistics," may also be collected which may include latency, jitter and packet loss per window of time. The flow quality management engine 132 also provides the detection and correction of upstream and/or downstream failures in the transmission of RTP data packets.

The host processor 138, similar to the traffic manager 134, provides detection and correction of upstream and downstream failures. Methods used by the host processor 138 to detect and correct upstream and downstream failures in the transmission of RTP multimedia packets include, but are not limited to, the use of link failures and external management events. The CAM 148 stores translations or bindings previously determined by "open/bin" requests for fast access by the network processor 142. Open/bind requests are discussed in detail within the '304 patent application. The CAM 148 may also be used to store media access control addresses to IP mappings as discussed below. There are many possible implementations of the CAM 148. An example of an external search engine is manufactured by and commercially available from Netlogic Microsystems, Inc, of Mountain View, Calif.

The media router 106 is capable of generating flow quality statistics for RTP multimedia flows. Further, the media router 106 is able to generate the flow quality statistics from RTP packets as they flow through the communication network 102. In certain situations the statistics are only relevant for links between media routers if more than one media router is utilized.

Preferably, the media router 106 stores one or more statistics for each flow. These statistics may include, but are not limited to, latency, jitter, a number of octets per packet, and/or the number of dropped packets. It should be noted that other statistics may also be stored with regard to each multimedia flow through the media router 118. Assuming that more than one media router is utilized, to generate statistics for each multimedia flow, the media router 106 runs a proprietary version of a protocol, such as, but not limited to, real-time transport control protocol (RTCP), between connected media routers to determine latency. Jitter and dropped packet statistics can be generated autonomously by the media router 106. The following describes how latency, jitter and dropped packets can be determined in the absence of RTCP information.

In order to measure latency for a data flow, the media router 106 communicates with another endpoint on the multimedia flow. The other endpoint may be another media router, although it need not be. As an example, the other endpoint may be a SIP phone. Assuming, for exemplary purposes, that the other endpoint is a media router, the subject of the communication between media routers is a test packet that is utilized to determine RTP data flow latency. The multimedia router 106 receiving the looped packet compares when the packet was received to when the packet was sent, thereby determining a round trip time. The round trip time is then cut in half to approximate the one-way time, which is the latency.

Rather than using a proprietary way to perform packet looping, RTCP packet format can be used between two media routers. This format allows extraction of a timestamp of the sender (from a send report) and placing the timestamp into the looped packet (in a receive report), as well as an estimate of how long it took to loop the packet.

Jitter is a measurement of the variation of the gap between packets on a flow. An alternative definition is that jitter is the variance in latency for a multimedia flow. The media router 106 can measure jitter for an RTP data flow as it transits the media router 106. When a data packet reaches the network processor 142, a timer is started that runs until the next packet for that RTP data flow arrives. The time gap between packet receipt is added to an aggregate to maintain a "mean" jitter value. The "mean" jitter value can also be compared to a min/max value in a flow record to determine if a new min/max jitter value is established. It should be noted that the flow record may be located within a network processor memory (not shown) that is located within the network processor 142. It should also be noted that the memories located within the media router 106 may all be located within a single memory stored within, or outside of the media router 106. In the situation where this process may be too processor intensive, jitter samples can be aggregated and min/max calculations can be performed on a periodic basis using the aggregated information.

Dropped packet, or lost packet, processing in the absence of an RTCP based mechanism may be accomplished on an RTP flow using two scoreboard arrays of booleans that are used to track when a packet is missing, and whether the packet appears within a jitter window. Alternate methods of processing multimedia packets may be used. It should be noted that a jitter window is typically implemented in voice gateways to compensate for fluctuating network conditions. The jitter window is a packet buffer that holds incoming packets for a specified amount of time, before forwarding them for decompression. The process has the effect of smoothing the packet flow, thereby increasing the resiliency of a compressor/de-compressor (CODEC) to packet loss, delaying packets, and producing other transmission effects. Preferably, the jitter window is defined by the session router 104, although it may be directly defined via the media router 106.

Each entry in a scoreboard array represents whether a media router has received a packet having a specific sequence number. The scoreboard array may be located within the network processor memory or within any local or distant memory. Each scoreboard array also has a counter which tracks how many entries have been marked "missing." Preferably, all entries are initially marked as "received."

As the sequence numbers are tracked in the network processor 142 and missing packets are detected, specifically, a packet with a sequence number that has incremented more than one, the appropriate entry in the current array is marked "missing" and the missing counter is incremented. Preferably, two arrays are sized as the maximum number of packets in the jitter window. These two arrays are hereinafter referred to as the current array and the aged array. When the current array reaches the maximum jitter window, the aged array is re-initialized and becomes the current array and the current array becomes the aged array. Before the aged array is erased, the counter for dropped packets is retrieved and accumulated for the data flow.

However, if an out of order old multimedia packet is received, wherein the sequence number is less than the current sequence number, the network processor 142 searches for the sequence number entry in either the current or aged array, depending on lateness of the packet. If the network processor 142 finds the entry marked missing and changes the entry, the network processor 142 then decrements a missing multimedia packet counter of the array that is used for keeping track of missing packets. If the packet is not marked as missing, then the network processor 142 designates that the packet is a duplicate. If the sequence number is so old that the multimedia packet dates back further than the depth of the jitter window, then the network processor 142 does not perform a lookup. It should be noted that this method of performing dropped packet counting is more accurate than that obtainable using RTCP.

Returning to FIG. 1, typically, there is at least one intervening device 116 located between the first SIP phone 112 and the media router 106. The intervening device 116 may be a router, such as, but not limited to, a border router, a firewall, or any other communication device. It should be noted, however, that an additional router, such as a border router, is not necessary in providing communication between the first SIP phone 112 and the second SIP phone 114.

Figure 3:
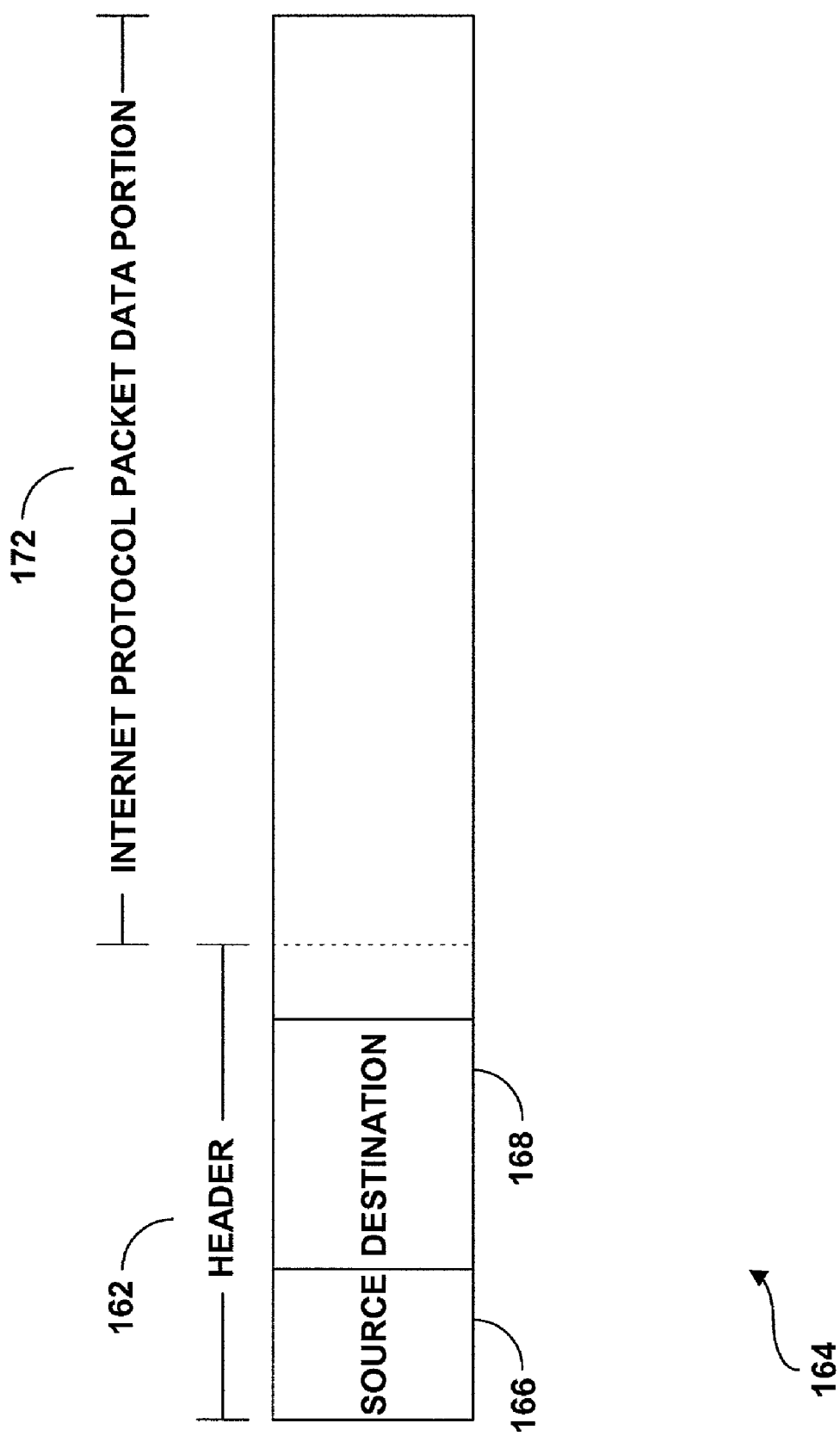
FIG. 3 is a simplified diagram illustrating parts of a multimedia packet that may be received by the media router of FIG. 2.

Multimedia packets received by the media router 106 comprise, among other portions, a header and an IP packet data portion. FIG. 3 is a simplified diagram illustrating the above mentioned parts of a multimedia packet 164. The header 162 of a multimedia packet 164, at a minimum, comprises, among other portions, at least a source portion 166 that identifies a source address from which the multimedia packet arrived, and a destination portion 168, that identifies a destination address to which the packet is addressed. As described above, an IP header may comprise many other portions, such as, but not limited to, an RTP header or an RTCP header.

While FIG. 1 provides a communication system 102 wherein the destination device is the second SIP phone 114, multiple destination devices may be connected to the first SIP phone 112 via the media router 106. The IP packet data portion 172 of the multimedia packet comprises the remaining portion of the multimedia packet 164, which comprises data that is being transmitted to the destination device located at the destination address.

When a multimedia packet is transmitted from the first SIP phone 112 (FIG. 1) to the media router 106, the source portion 166 of the header 162 comprises the IP address and port of the first SIP phone 112, and the destination portion 168 of the header 162 comprises the IP address and port of the media router 106. Once again, it should be noted that the header 162 may comprise numerous other portions, or headers, therein. If an intervening device 116 is located between the first SIP phone 112 and the media router 106, the intervening device 116 receives the transmitted multimedia packet prior to the media router 106. Before transmitting the received multimedia packet to the media router 106, the intervening device 116 may change the properties of the header 162 of the received multimedia packet 164, so that the source portion 166 of the header 162 reflects that the multimedia packet has been transmitted from the intervening device 116. Therefore, when the multimedia packet is received by the media router 106, the media router 106 is not capable of determining the original source of the multimedia packet since the source portion 166 of the multimedia packet reflects that the source of the multimedia packet is the device from which the multimedia packet was last transmitted.

The ability to determine the original source of a multimedia packet is important to devices such as, but not limited to, firewalls, where multimedia packet entry into a device associated with the firewall is dependent upon the source of the received multimedia packet. Therefore, determination of an original source of a received multimedia packet is desirable, and within certain devices, such as a firewall, necessary.

To enable determination of the original source of a multimedia packet the CAM 148 (FIG. 2) and the network processor 142 are utilized. The network processor 142 performs a series of actions on a received multimedia packet after receipt by the media router 106. Generally, the network processor 142 removes a level two header, such as, but not limited to, a link protocol header, or layer two header, from the received multimedia packet. An example of a link protocol header may include, but is not limited to, an Ethernet header or high-level data link control (HDLC) header. The layer two header is removed so that a layer three header located within the data packet, and a layer four header located within the data packet, may be examined by the media router 106. The layer three header comprises source IP and destination IP addresses, and the layer four header comprises source and destination ports, as assigned by the session router 104 or directly assigned to the media router 106. The layer three and four headers may be validated and changed by the network processor 142 via use of the CAM 148, as is described below.

FIG. 4 is a multimedia packet flow table 202 located within the CAM 148 that is utilized by the network processor 142 to enable determination of an original source of a received multimedia packet. As is shown by FIG. 4, the multimedia packet flow table 202 comprises a source IP address column 212, a destination IP address column 214, a source port column 216, a destination port column 218, a weight column 222, a flag column 224, and a translation addresses column 226, each of which is described below.

Each column 212, 214, 216, 218, 222, 224, 226 within the multimedia packet flow table 202 comprises a series of cells, which are utilized to store information associated with their corresponding column name. Therefore, each source IP address cell comprises a source IP address; each destination IP address cell comprises a destination IP address; each source port cell comprises a source port; each destination port cell comprises a destination port; and each translation address cell comprises replacement layer three addresses including a replacement source address and a replacement destination address. It should be noted that the translation address cell may also comprise a replacement source port and a replacement destination port, although, for simplification purposes, use of a replacement source port and a replacement destination port are not described herein.

The weight column 222 is utilized to associate a weight value with each grouping of a source IP address, destination IP address, source port, and destination port (i.e., a first source IP address, a first destination IP address, a first source port, a first destination port). Therefore, a group comprising the first source IP address, first destination IP address, first source port and first destination port is assigned a single weight value. Hereinafter, a group of cells comprising a first source IP address, a first destination IP address, a first source port and a first destination port is referred to as a first table group; a group comprising a second source IP address, a second destination IP address, a second source port and a second destination port is referred to as a second table group, etc. The weight value is utilized to assign priority to one table group over another table group. A detailed explanation of the weight value and a demonstration of its use are provided below.

A universal bit, represented by the variable X, may be utilized by a cell within the multimedia packet flow table 202 to represent that any value is acceptable for that particular cell. Specific to the present source determination system, the universal bit is utilized within the source IP address column 212 and the source port column 216 to allow acceptance of a multimedia packet from any source, wherein the destination IP address and destination port of the received multimedia packet are similar to a destination IP address and destination port. Universal bit acceptance is described below with reference to FIGS. 5A, 5B and 5C.

The flag column 224 may provide a latch bit, designated as L, for an associated table group to indicate that multimedia packets may be received by a new source that is not yet represented by the CAM 148. In fact, the number of latch bits provided within the multimedia packet flow table 202 indicates the number of multimedia packet sources, not yet provided for by the CAM 148, that will be allowed to communicate with the media router 106. The latch bit is utilized in combination with universal bits during inspection of a received multimedia packet. The latch bit is utilized to specify if a new table group should be created within the CAM 148 for the received multimedia packet that comprises an acceptable destination IP address, an acceptable destination port, a newly received source IP address, and a newly received source port.

If a latch bit is associated with a table group, and a universal bit is located within both the source IP address cell of the table group and the source port cell of the table group, then the following steps are performed. First, a new table group is created wherein the value stored within the destination IP address cell of the new table group, and the value stored within the destination port cell of the new table group, is copied from the prior table group comprising the latch bit and universal bits. In addition, the source IP address cell of the new table group stores therein the IP address of the source of the received multimedia packet, and the source port cell of the new table group stores therein the port address of the source of the received multimedia packet.

It is preferred that the weight of a table group comprising universal bits be lower than the weight of a table group not comprising universal bits. As a result, the table group not having universal bits will be selected by the network processor 142 prior to selection of the table group comprising universal bits.

A second step performed if a latch bit is associated with a table group, and a universal bit is located within both the source IP address cell of the table group and the source port cell of the table group, is to add a high weight factor value to the new table group that is comparable to a weight factor value utilized for a table group not having universal bits. It should be noted that a latch flag is not set for the new table group. A third step performed is to delete the original table group, comprising the latch bit and universal bits, from the multimedia packet flow table 202. The order of the prior mentioned steps ensures that after a first multimedia packet is received, which is defined by the original table group, the original table group is no longer utilized for allowing receipt of multimedia packets. The layer three header of multimedia packets received by the media router 106 that comprise characteristics designated by a table group is then replaced with the translation addresses associated with the table group.

An example of a multimedia packet flow table 252 is provided by FIGS. 5A, 5B, and 5C for purposes of demonstrating the above mentioned steps. FIG. 5A provides a multimedia packet flow table 252 comprising a source IP address column 262, a destination IP address column 272, a source port column 282, a destination port column 292, a weight column 302, a flag column 312, and a translation addresses column 322. Each of the above mentioned columns comprises a number of cells, four of which are provided in the present example. Four rows of cells, or table groups, are provided by the multimedia packet flow table 252, namely, a first table group 332, a second table group 334, a third table group 336, and a fourth table group 338.

If the header portion 162 of a received multimedia packet comprises a source IP address of 1.1.1.1, a destination IP address of 2.2.2.2, a source port of 1001 and a destination port of 2001, the CAM 148 returns associated translation addresses, comprising a replacement source address and a replacement destination address, to the network processor 142. As shown by FIG. 5A, the translation addresses associated with the first table group 332 are 10.1.1.1/20.2.2.2. The translated addresses are incorporated into the header 162 of the received multimedia packet by the network processor 142, thereby designating a new source address of 10.1.1.1 and a new destination address of 20.2.2.2 for the multimedia packet.

If the header portion 162 of a received multimedia packet comprises a source IP address of 2.2.2.1, a destination IP address of 2.2.2.2, a source port of 3000 and a destination port of 2001, the CAM 148 returns associated translation addresses, comprising a replacement source address and a replacement destination address, to the network processor 142. As shown by FIG. 5A, the translated addresses associated with the third table group 336 are 20.2.2.1/20.2.2.2. The translated addresses are incorporated into the header 162 of the received multimedia packet by the network processor 142, thereby designating a new source address of 20.2.2.1 and a new destination address of 20.2.2.2 for the multimedia packet.

Instead, if the header portion 162 of a received multimedia packet comprises a source IP address of 3.3.3.3, a destination IP address of 2.2.2.2, a source port of 5000 and a destination port of 2001, the CAM 148 returns associated translation addresses, comprising a replacement source address and a replacement destination address, to the network processor 142. As shown by FIG. 5A, the translation addresses associated with the fourth table group 338 are 30.3.3.3/20.2.2.2. The translated addresses are incorporated into the header 162 of the received multimedia packet by the network processor 142, thereby designating a new source address of 30.3.3.3 and a new destination address of 20.2.2.2 for the multimedia packet.

Alternatively, if the header portion 162 of a received multimedia packet comprises a source IP address designated by a universal bit, a destination IP address of 2.2.2.2, a source port designated by a universal bit, a destination port of 2001, and a set latch bit, the following occurs. As is shown by FIG. 5B, a fifth table group 342 is created having similar characteristics to the second table group 334. Specifically, the destination IP address (2.2.2.2), destination port (2001), and translation addresses (X/20.2.2.2) are copied from the second table group 334 to the fifth table group 342. It should be noted that the translation address, X/20.2.2.2, establish that the replacement source address is the address of the latest source of the multimedia packet and the replacement destination address is 20.2.2.2. The latch bit is not set in the fifth table group 342 and the weight for the fifth table group 342 is set to be equivalent or similar to other table groups 332, 336, 338.

The IP address and port of the device that last transmitted the received multimedia packet to the media router 164, is stored in the source IP address column 262 and the source port column 282, respectively, within the fifth table group 342. As is shown by FIG. 5C, information within the second table group 334 is then deleted from the multimedia packet flow table 252. Since the fifth table group 342 comprises a source IP address, destination IP address, source port, destination port, weight, and translation addresses, the fifth table group 342 is capable of being used to direct a received multimedia packet to a destination. In addition, since the latch bit is no longer set within the multimedia packet flow table 252 and the universal bits within the source IP address column 262 and the source port column 282 have been deleted, the media router 164 will no longer accept multimedia packets from a device that does not comprise a source IP address, destination IP address, source port and destination port combination, defined by a single table group.

After the new source IP address and source port have been determined, the media router 164 may transmit the source IP address and source port to the session router 104. The session router 104 may then be utilized to determine additional information about the source of the received multimedia packet such as, whether the latched source address is valid. The media router 164 will inform the session router 104 of the latched source address using the protocol used for flow setup and tear-down. In addition, it should be noted that more than one combination of universal bits and latch flags may be utilized within the multimedia packet flow table 252 to allow the introduction of more than one new source device for communication with the media router 164.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The following is claimed:

1. A method of determining a source of an Internet protocol (IP) packet comprising the steps of:

comparing a destination address of said IP packet to a first destination address stored within a first destination address cell of memory, and comparing a destination port of said IP packet to a first destination port stored within a first destination port cell of said memory;

comparing a source address of said IP packet to a first source address stored within a first source address cell of said memory, and comparing a source port of said IP packet to a first source port stored within a first source port cell of said memory, wherein said stored first source address and said stored first source port are associated with said stored first destination address and said stored first destination port; and storing said source address and said source port of said IP packet within said memory to determine said source of said IP packet if:

said destination address and said destination port of said IP packet match said stored first destination address and said stored first destination port;

said source address and said source port of said IP packet do not match said stored first source address and said stored first source port; and said stored first source address and said stored first source port are universal bits, wherein universal bits are bits that accept any value, wherein a first table group stored within said memory comprises said stored first destination address, said stored first destination port, said stored first source address and said stared first source port, said first table group being assigned a first weight value, said memory having a second table group comprising a stored second destination address, a stored second destination port, a stored second source address and a stored second source port, wherein said stored second source address and said stored second source port are universal cells, and said second table group being assigned a second weight value, said method further comprising the steps of:

prior to said step of storing said source address and said source port of said IP packet, comparing said source address, source port, destination address, and destination port of said IP packet to said first table group and said second table group; and if said source address, source port, destination address, and destination port of said IP packet are the same as said first table group, and said destination address and destination port of said IP packet are the same as said stored second destination address and said stored second destination port, comparing said first weight value to said second weight value, and not performing said step of storing said source address and said source port of said IP packet if said first weight value is larger than said second weight value.

2. The method of claim 1, wherein said memory is a content addressable memory.

3. The method of claim 1, wherein a table group comprising universal bits has a lower weight value than a table group not comprising universal bits.

4. The method of claim 1, wherein first table group stored within said memory further comprises said stored first destination address, said stored first destination port, said stored first source address, said stored first source port and a latch flag, wherein said stored first source address and said stored first source port are universal bits, said step of storing said source address and said source port of said IP packet within said memory further comprising the steps of:
    storing said source address, said source port, said destination address and said destination port of said IP packet within a new table group, wherein said new table group does not have a latch flag; and
    deleting said first table group.

5. The method of claim 1, wherein a first weight value is associated with said first table group, and wherein said new table group is assigned a new weight value that is higher than said first weight value.

6. A system for determining a source of an Internet protocol (IP) packet, comprising:
    a memory; and
    a processor, wherein said processor performs the steps of:
    comparing a destination address of said IP packet to a first destination address stored within a first destination address cell of said memory, and comparing destination port of said IP packet to a first destination port stored within a first destination port tell of said memory;
    comparing a source address of said IP packet to a first source address stored within a first source address cell of said memory, and comparing a source port of said IP packet to a first source fort stored within a first source port cell of said memory, wherein said stored first source address and said stored first source port are associated with said stored first destination address and said stored first destination port; and
    storing said source address and said source port of said IP packet within said memory to determine said source of said IP packet if:
    said destination address and said destination port of said packet match said stored first destination address and said stored first destination port;
    said source address and said source port of said IP packet do not match said stored first source address and said stored first source port:
    and said stored first source address and said stored first source port are universal bits, wherein universal bits are bits that except any value,
    wherein a first table group stored within said memory comprises said stored first destination address, said stored first destination port, said stored first source address and said stored first source port, said first table group having a first weight value, said memory having a second table group comprising a stored second destination address, a stored second destination port, a stored second source address and a stored second source port, wherein said stored second source address and said stored second source port are universal cells, and said second table group having a second weight value, said processor further performing the steps of:
    prior to said step of storing said source address and said source port of said IP packet, comparing said source address, source port, destination address, and destination port of said IP packet to said first table group and said second table group; and
    if said source address, source port, destination address, and destination port of said IP packet are the same as said first table group, and said destination address and destination port of said IP packet are the same as said stored second destination address and said stored second destination port, comparing said first weight value to said second weight value, and not performing said step of storing said source address and said source port of said IP packet if said first weight value is larger than said second weight value.

7. The system of claim 6, wherein a table group comprising universal bits has a lower weight value than a table group not comprising universal bits.

8. The system of claim 6, wherein the first table group stored within said memory comprises said stored first destination address, said stared first destination port, said stored first source address, said stored first source port and a latch flag, wherein said stored first source address and said stored first source port are universal bits, said step of storing said source address and said source port of said IP packet within said memory further comprising the step of,
    said processor storing said source address, said source port, said destination address and said destination port of said IP packet within a new table group, within said memory, wherein said new table group does not have a latch flag; and
    deleting said first table group.

9. The system of claim 8, wherein a first weight value is associated with said first table group, and wherein said new table group is assigned a new weight value that is higher than said first weight value.

10. A method of detecting a new Internet protocol (IP) packet using a multimedia packet flow table, comprising:
    examining a received IP packet comprising a destination address and a source address; and
    creating a new table group in the multimedia packet flow table, based on the source address in the IP packet and on a matching destination address cell of an existing table group in the multimedia packet flow table, if:
    the destination address of the IP packet matches a destination address cell of an existing table group in the multimedia packet flow table;
    the source address of the IP packet does not match a source address cell of the existing table group that includes universal bits; and
    a latch bit in the existing table group is set.

11. The method of claim 10, further comprising:
    copying the destination address cell of the matching existing table group to the new table group; and
    copying the source address in the IP packet to the new table group.

12. The method of claim 10, further comprising:
    clearing the latch bit in the new table group.

13. The method of claim 10, further comprising:
    copying a source translation address cell of the existing table group to a translation address cell of the new table group, wherein universal bits in the source translation address cell establish that the replacement source address in the translation address cell is the source address of the IP packet.

14. The method of claim 10, further comprising:
if the source address and destination address of the IP packet match the contents of respective cells in the existing table group, and the destination address and destination port of the IP packet are the same as the contents of a second destination address cell, then:
   comparing a first weight value to a second weight value, and
   leaving the source address of the IP packet unchanged when the first weight value is larger than the second weight value.

15. The method of claim 10, further comprising:
deleting the contents of a plurality of cells within the matching existing table group.

16. The method of claim 10, wherein a first weight value is associated with the existing table group, and wherein the new table group is assigned a new weight value that is higher than the first weight value.

17. A system for detecting a pew Internet protocol (IP) packet from a source not yet present in a multimedia packet flow table, comprising:
   a content addressable memory storing at least one table group, the table group further comprising a source address cell, a destination address cell, and a latch bit; and
   a processor coupled to the content addressable memory wherein the processor,
   examines a received IP packet comprising a destination address and a source address; and
   stores a new table group in the memory, based on the source address in the IP packet and on a matching destination address cell, if:
      the destination address of the IP packet matches the destination address cell of the at least one table group;
      the source address cell of the at least one table group includes universal bits and does not match the source address of the IP packet; and
      a latch bit in the at least one table group is set.

18. The system of claim 17, wherein the processor copies the destination address cell of the matching existing table group to the new table group; and
   copy the source address in the IP packet to the new table group.

19. The system of claim 17, wherein the processor clears the latch bit in the new table group.

20. The system of claim 17, wherein the processor deletes the contents of a plurality of cells within the matching existing table group.

21. The system of claim 17, wherein a first weight value is associated with the at least one table group, and wherein the new table group is assigned a new weight value that is higher tan the first weight value.

* * * * *